United States Patent
Mahajan

(10) Patent No.: US 12,547,469 B2
(45) Date of Patent: Feb. 10, 2026

(54) TRAINING A MACHINE LEARNING MODEL USING AN ACCELERATION PIPELINE WITH POPULAR AND NON-POPULAR MICRO-BATCHES

(71) Applicant: Microsoft Technology Licensing, LLC, Redmond, WA (US)

(72) Inventor: Divya Mahajan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 402 days.

(21) Appl. No.: 18/126,350

(22) Filed: Mar. 24, 2023

(65) Prior Publication Data

US 2024/0320054 A1  Sep. 26, 2024

(51) Int. Cl.
G06F 9/46 (2006.01)
G06F 9/48 (2006.01)
G06F 9/50 (2006.01)

(52) U.S. Cl.
CPC ......... *G06F 9/5066* (2013.01); *G06F 9/4881* (2013.01); *G06F 9/5033* (2013.01); *G06F 2209/5017* (2013.01)

(58) Field of Classification Search
None
See application file for complete search history.

(56) References Cited

FOREIGN PATENT DOCUMENTS

KR    10-2023-0094283    6/2023

OTHER PUBLICATIONS

"MLPerf", Retrieved From: https://mlcommons.org/en/training-normal-10/, Jun. 30, 2021, 5 Pages.
"NVIDIA Deep Learning NCCL Documentation", Retrieved From: https://docs.nvidia.com/deeplearning/nccl/index.html, Retrieved on: Jan. 4, 2023, 1 Page.
"NVLink", Retrieved From: https://www.nvidia.com/en-us/data-center/nvlink/, Retrieved on: Jan. 4, 2023, 8 Pages.
"Terabyte Click Logs", Retrieved From : https://labs.criteo.com/2013/12/download-terabyte-click-logs/, Dec. 12, 2013, 8 Pages.

(Continued)

*Primary Examiner* — Bing Zhao
(74) *Attorney, Agent, or Firm* — Klarquist Sparkman, LLP

(57) ABSTRACT

Innovations in training a machine learning model using an accelerator pipeline with deferred updates to model parameters are described. An accelerator identifies one or more first-class micro-batches ("MBs") and a second-class MB of a working set. A first-class MB contains, as inputs, frequently accessed embeddings stored in graphics processing unit ("GPU") memory. The accelerator schedules the first-class MB(s) for training using one or more GPUs. During the training, the accelerator obtains the second-class MB, which contains, as inputs, non-frequently accessed embeddings stored in main memory. At least some updates to the model parameters from the training with the first-class MB(s) are deferred until after training with the second-class MB. The accelerator schedules the second-class MB for training. Finally, after the training with the second-class MB, the accelerator updates the non-frequently accessed values for the second-class MB. At this point, the GPU(s) also update model parameters, applying deferred updates.

20 Claims, 6 Drawing Sheets

(56) References Cited

OTHER PUBLICATIONS

"User Behavior Data from Taobao for Recommendation", Retrieved From: https://tianchi.aliyun.com/dataset/649 , May 10, 2018, 2 Pages.

Abadi, et al., "TensorFlow: Large-Scale Machine Learning on Heterogeneous Distributed Systems", In Publication of Preliminary White Paper, Nov. 9, 2015, 19 Pages.

Acun, et al., "Understanding Training Efficiency of Deep Learning Recommendation Models at Scale", In Repository of arXiv:2011.05497v1, Nov. 11, 2020, 13 Pages.

Adnan, et al., "Accelerating Recommendation System Training by Leveraging Popular Choices", In Proceedings of the VLDB Endowment, 2021, pp. 127-140.

Agarwal, et al., "BagPipe: Accelerating Deep Recommendation Model Training", In Repository of arXiv:2202.12429v2, Dec. 14, 2022, 21 Pages.

Chen, et al., "Eyeriss: a spatial architecture for energy-efficient dataflow for convolutional neural networks", In Journal ACM SIGARCH Computer Architecture NewsVolume 44Issue 3, Jun. 18, 2016, pp. 367-379.

Cho, et al., "WAVE: Popularity-based and Collaborative In-Network Caching for Content-Oriented Networks", In Proceedings IEEE Infocom Workshops, Mar. 25, 2012, pp. 316-321.

Chung, et al., "Serving DNNs in Real Time at Datacenter Scale with Project Brainwave", In Journal IEEE Micro, vol. 38, Issue 2, Apr. 20, 2018, pp. 8-20.

Eisenman, et al., "Bandana: Using Non-Volatile Memory for Storing Deep Learning Models", In Proceedings of Machine Learning and Systems, Apr. 2019, 13 Pages.

Fowers, et al., "A High Memory Bandwidth FPGA Accelerator for Sparse Matrix-Vector Multiplication", In IEEE 22nd Annual International Symposium on Field-Programmable Custom Computing Machines, May 11, 2014, pp. 36-43.

Ginart, et al., "Mixed Dimension Embeddings with Application to Memory-Efficient Recommendation Systems", In Repository of arXiv:1909.11810v3, Feb. 8, 2021, 16 Pages.

Gunny, et al., "Accelerating Wide & Deep Recommender Inference on GPUs", Retrieved From: https://developer.nvidia.com/blog/accelerating-wide-deep-recommender-inference-on-gpus/, Dec. 17, 2019, 8 Pages.

Gupta, et al., "DeepRecSys: A System for Optimizing End-to-End at-scale Neural Recommendation Inference", In Repository of arXiv:2001.02772v1 [cs.DC] Jan. 8, 2020, Jan. 8, 2020, 14 Pages.

Gupta, et al., "The Architectural Implications of Facebook's DNN-Based Personalized Recommendation", In Proceedings of IEEE International Symposium on High Performance Computer Architecture, Feb. 22, 2020, pp. 488-501.

Huang, et al., "Embedding-based Retrieval in Facebook Search", In Proceedings of the 26th ACM SIGKDD International Conference on Knowledge Discovery & Data Mining, Aug. 20, 2020, pp. 2553-2561.

Hwang, et al., "Centaur: A Chiplet-based, Hybrid Sparse-Dense Accelerator for Personalized Recommendations", In Repository of arXiv:2005.05968v1, May 12, 2020, 14 Pages.

Ishkhanov, et al., "Time-based Sequence Model for Personalization and Recommendation Systems", In Repository of arXiv:2008.11922v1 [cs.IR] Aug. 27, 2020, Aug. 27, 2020, 17 Pages.

Jain, et al., "Gist: Efficient Data Encoding for Deep Neural Network Training", In Proceedings ACM/IEEE 45th Annual International Symposium on Computer Architecture, Jun. 1, 2018, pp. 776-789.

Jaleel, et al., "High performance cache replacement using re-reference interval prediction", In Journal of ACM SIGARCH Computer Architecture News, Jun. 19, 2010, pp. 60-71.

Jeon, et al., "Analysis of Large-Scale Multi-Tenant GPU Clusters for DNN Training Workloads", In Proceedings of the USENIX Annual Technical Conference, Jul. 10, 2019, pp. 947-960.

Jiang, et al., "XDL: an industrial deep learning framework for high-dimensional sparse data", In Proceedings of the 1st International Workshop on Deep Learning Practice for High-Dimensional Sparse, Aug. 5, 2019, 9 Pages.

Jouppi, et al., "In-Datacenter Performance Analysis of a Tensor Processing Unit", In Proceedings of the 44th Annual International Symposium on Computer Architecture, Jun. 24, 2017, 12 Pages.

Kalamkar, et al., "Optimizing Deep Learning Recommender Systems Training on CPU Cluster Architectures", In Proceedings of International Conference for High Performance Computing, Networking, Storage and Analysis, Nov. 9, 2020, 15 Pages.

Ke, et al., "RecNMP: Accelerating Personalized Recommendation with Near-Memory Processing", In Proceedings of ACM/IEEE 47th Annual International Symposium on Computer Architecture, May 30, 2020, pp. 790-803.

Kwon, et al., "MAERI: Enabling Flexible Dataflow Mapping over DNN Accelerators via Reconfigurable Interconnects", In Journal of ACM SIGPLAN Notices, vol. 53, Issue 2, Mar. 19, 2018, pp. 461-475.

Kwon, et al., "TensorDIMM: A Practical Near-Memory Processing Architecture for Embeddings and Tensor Operations in Deep Learning", In Proceedings of the 52nd Annual IEEE/ACM International Symposium on Microarchitecture, Oct. 12, 2019, pp. 740-753.

Lee, et al., "NVIDIA-Merlin / HugeCTR", Retrieved From: https://github.com/NVIDIA-Merlin/HugeCTR, Mar. 17, 2023, 10 Pages.

Liu, et al., "PuDianNao: A Polyvalent Machine Learning Accelerator", In Journal ACM SIGARCH Computer Architecture News, vol. 43, Issue 1, Mar. 14, 2015, pp. 369-381.

Luby, et al., "How to Construct Pseudorandom Permutations from Pseudorandom Functions", In Journal of SIAM Computing, vol. 17, Issue 2, Apr. 1988, pp. 373-386.

Mahajan, et al., "TABLA: A Unified Template-based Framework for Accelerating Statistical Machine Learning", In Proceedings of IEEE International Symposium on High Performance Computer Architecture, Mar. 12, 2016, pp. 14-26.

Mudigere, et al., "Software-hardware Co-design for Fast and Scalable Training of Deep Learning Recommendation Models", In Proceedings of the 49th Annual International Symposium on Computer Architecture, Jun. 11, 2022, pp. 993-1011.

Muralimanohar, et al., "Optimizing NUCA Organizations and Wiring Alternatives for Large Caches with CACTI 6.0", In Proceedings of 40th Annual IEEE/ACM International Symposium on Microarchitecture, Dec. 1, 2007, 12 Pages.

Naumov, et al., "Deep Learning Recommendation Model for Personalization and Recommendation Systems", In Repository of arXiv: 1906.00091v1, May 31, 2019, 10 Pages.

Nguyen, et al., "Optimizing the Deep Learning Recommendation Model on NVIDIA GPUs", Retrieved From: https://developer.nvidia.com/blog/optimizing-dlrm-on-nvidia-gpus/, Jun. 18, 2020, 6 Pages.

Papadopoulos, et al., "Popularity versus similarity in growing networks", In Publication of Nature, Sep. 12, 2012, pp. 537-540.

Park, et al., "Scale-out acceleration for machine learning", In Proceedings of the 50th Annual IEEE/ACM International Symposium on Microarchitecture, Oct. 14, 2017, pp. 367-381.

Paszke, et al., "Automatic differentiation in PyTorch", In Proceedings of 31st Conference on Neural Information Processing Systems, Oct. 28, 2017, 4 Pages.

Reagen, et al., "Minerva: enabling low-power, highly-accurate deep neural network accelerators", In Journal of ACM SIGARCH Computer Architecture News, vol. 44, Issue 3, Jun. 18, 2016, pp. 267-278.

Sethi, et al., "RecShard: statistical feature-based memory optimization for industry-scale neural recommendation", In Proceedings of the 27th ACM International Conference on Architectural Support for Programming Languages and Operating Systems, Feb. 22, 2022, pp. 344-358.

Sharma, et al., "From high-level deep neural models to FPGAs", In Proceedings of the 49th Annual IEEE/ACM International Symposium on Microarchitecture, Oct. 15, 2016, 12 Pages.

Shi, et al., "Compositional Embeddings Using Complementary Partitions for Memory-Efficient Recommendation Systems", In

(56) References Cited

OTHER PUBLICATIONS

Proceedings of the 26th ACM SIGKDD International Conference on Knowledge Discovery & Data Mining, Aug. 20, 2020, pp. 165-175.
Sun, et al., "A Generic Network Compression Framework for Sequential Recommender Systems", In Proceedings of the 43rd International ACM SIGIR Conference on Research and Development in Information Retrieval, Jul. 25, 2020, pp. 1299-1308.
Tien, et al., "Display Advertising Challenge", Retrieved From: https://www.kaggle.com/c/criteo-display-ad-challenge, Sep. 24, 2014, 1 Page.
Wang, et al., "Click-Through Rate Prediction", Retrieved From : https://www.kaggle.com/c/avazu-ctr-prediction, Feb. 10, 2015, 1 Page.
Wu, et al., "Developing a Recommendation Benchmark for MLPerf Training and Inference", In Repository of arXiv:2003.07336v1, Mar. 16, 2020, 5 Pages.
Wu, et al., "Saec: similarity-aware embedding compression in recommendation systems", In Proceedings of the 11th ACM SIGOPS Asia-Pacific Workshop on Systems, Aug. 24, 2020, pp. 82-89.
Adnan et al., "High-Performance Training by Exploiting Hot-Embeddings in Recommendation Systems," arXiv:2103.00686v2, 15 pp. (Mar. 2021).
International Search Report and Written Opinion dated Jul. 8, 2024, from International Patent Application No. PCT/US2024/019318, 16 pp.
Adnan et al., "Heterogeneous Acceleration Pipeline for Recommendation System Training," arXiv:2204.05436v1, 17 pp. (Apr. 2022).
Brown et al., "Language Models are Few-Shot Learners," arXiv:2005.14165v4, 75 pp. (Jul. 2020).
Naumov et al., "Deep Learning Training in Facebook Data Centers: Design of Scale-up and Scale-out Systems," arXiv:2003.09518v3, 10 pp. (Aug. 2020).
UBC Advanced Research Computing, "UBC ARC Sockeye," downloaded from World Wide Web, 2 pp. (2019).
Wang et al., "Scaling Deep Trench Based eDRAM on SOI to 32nm and Beyond," *IEEE Int'l Electron Devices Meeting (IEDM)*, 4 pp. (Dec. 2009).
Yin et al., "TT-Rec: Tensor Train Compression for Deep Learning Recommendation Model Embeddings," arXiv:2101.11714v1, 15 pp. (Jan. 2021).
Zhao, et al., "Distributed Hierarchical GPU Parameter Server for Massive Scale Deep Learning Ads Systems", In Proceedings of Machine Learning and Systems 2, Mar. 2020, 17 Pages.
Yang, et al., "Mixed-Precision Embedding Using a Cache", In Repository of arXiv:2010.11305v1, Oct. 21, 2020, 14 Pages.
Zhao, et al., "Understanding Data Storage and Ingestion for Large-scale Deep Recommendation Model Training: Industrial Product", In Proceedings of the 49th Annual International Symposium on Computer Architecture, Jun. 11, 2022, 16 Pages.
Communication pursuant to Rules 161(1) and 162 EPC dated Oct. 31, 2025, from European Patent Application No. 24716053.4, 3 pp.
International Preliminary Report on Patentability dated Oct. 9, 2025, from International Patent Application No. PCT/US2024/019318, 10 pp.

software 180 implementing one or more innovations training a machine learning model using an acceleration pipeline with deferred updates

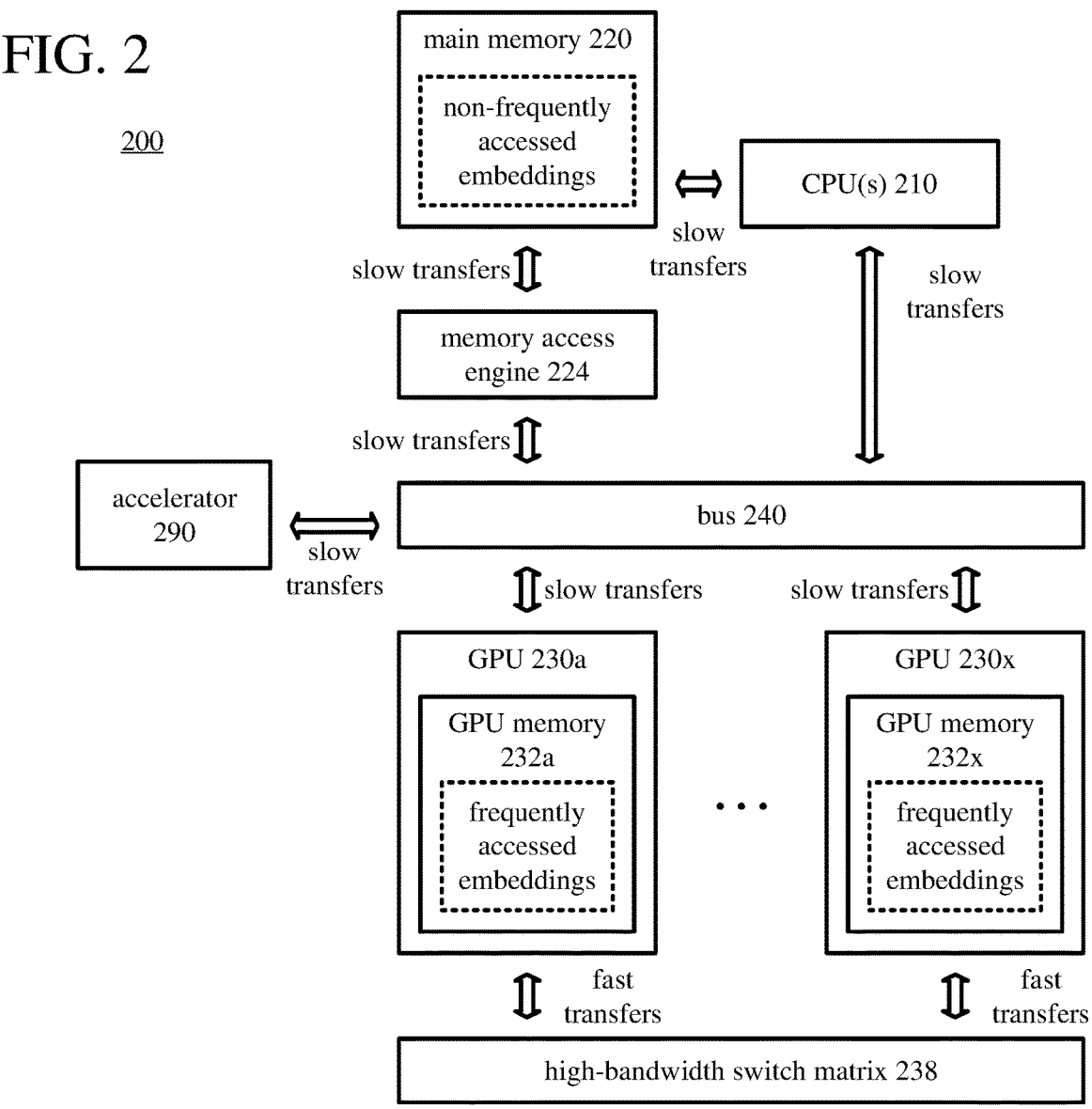

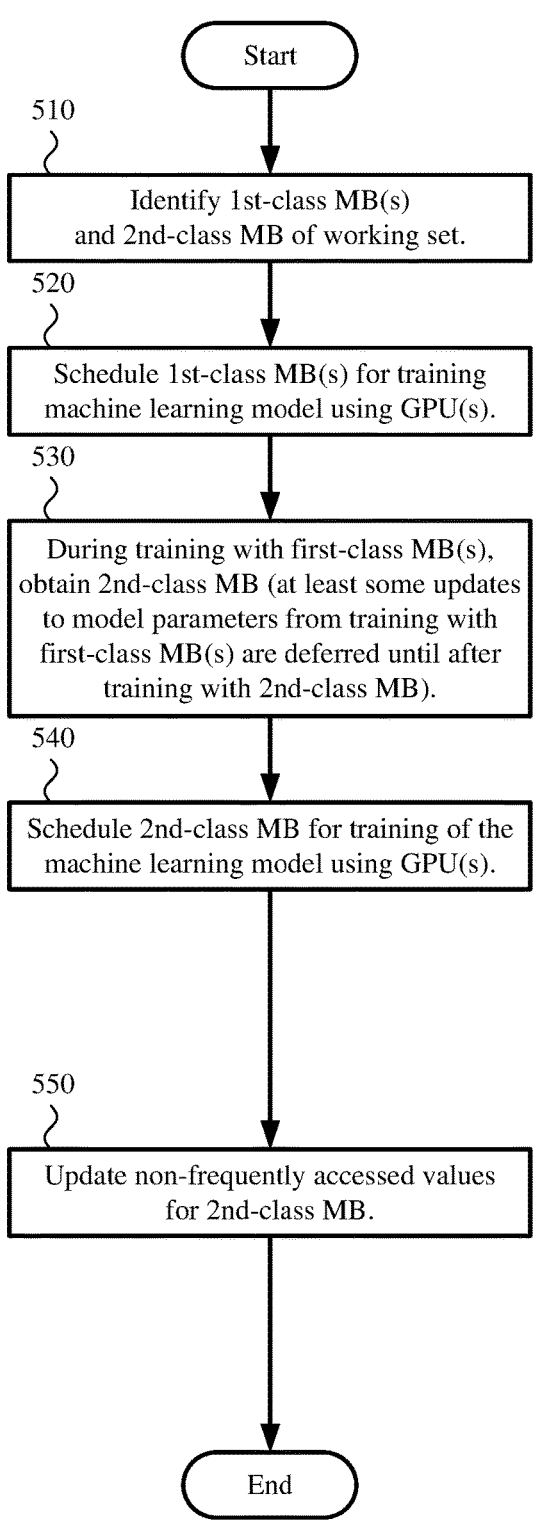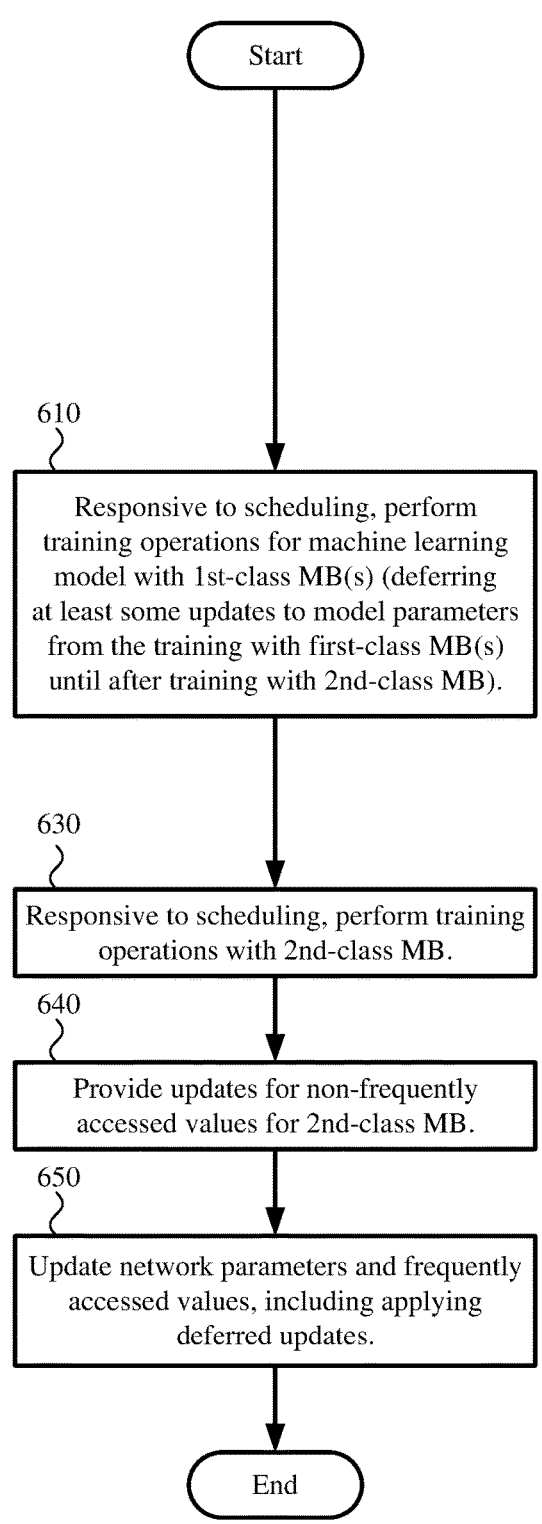

TRAINING A MACHINE LEARNING MODEL USING AN ACCELERATION PIPELINE WITH POPULAR AND NON-POPULAR MICRO-BATCHES

BACKGROUND

In a computer system, machine learning uses statistical techniques to extract features from a set of training data. The extracted features can then be applied when classifying new data. Machine learning techniques can be useful in a large number of usage scenarios, such as recognizing images and speech, analyzing and classifying information, and performing various other classification tasks. For example, features can be extracted by training an artificial neural network, which may be a deep neural network ("DNN") with multiple hidden layers of nodes. After the DNN is trained, new data can be classified according to the trained DNN.

A recommendation model (also called a recommendation system, platform, or engine) typically provides suggestions for items that are interesting, promising, or otherwise pertinent to a user. The items can be books, television shows, movies, news stories, products, songs, people, other entities, restaurants, other locations, services, or any other type of item. In many implementations, a recommendation model is trained using machine learning (e.g., with a DNN) based on ratings for a group of users for a selection of items. After training, the recommendation model can be used to identify new items that are pertinent for a given user, or the recommendation model can be used to identify new users for which a given item is pertinent.

Machine learning tools often execute on general-purpose processors in a computer system, such as a central processing unit ("CPU") or general-purpose graphics processing unit ("GPU"). Training operations can be computationally expensive, however, such that training is impractical for machine learning models that are large and/or complicated. Even when training is performed using special-purpose computer hardware, training can be time-consuming and resource-intensive.

In particular, recommendation models for a large number of users and wide range of items can require vast amounts of memory and computational resources in a computer system for training operations. Some approaches have used an accelerator pipeline for training operations in order to use resources more efficiently during training operations, which can potentially save time and reduce energy consumption. In some cases, however, such approaches can introduce discrepancies into the results of the training process, compared to the results of training without an accelerator pipeline. Accordingly, there is room for improvement in approaches to train machine learning models.

SUMMARY

In summary, the detailed description presents innovations in training a machine learning model ("MLM"), such as a recommendation model, using an accelerator pipeline with deferred updates to model parameters. With the innovations, in many usage scenarios, resources can be used more efficiently during training operations due to the accelerator pipeline, while reducing or even eliminating discrepancies in results of the training process, compared to the results of training the MLM without an accelerator pipeline.

According to a first set of techniques and tools described herein, a computer system includes at least one graphics processing unit ("GPU"), GPU memory, main memory associated with at least one central processing unit ("CPU"), and an accelerator. The GPU(s) are configured to train an MLM such as a recommendation model. The MLM has model parameters, which can include network parameters (such as weight values for nodes, bias values for nodes, and values for activation functions in a neural network) and values in a set of embeddings. The embeddings may be organized as embedding tables. The GPU memory is configured to store frequently accessed values of the set of embeddings. On the other hand, the main memory is configured to store non-frequently accessed values of the set of embeddings. The accelerator is configured to perform accelerator operations with deferred updates to model parameters.

In operation, the accelerator identifies one or more first-class micro-batches ("MBs") and a second-class MB of a given working set. For example, the accelerator identifies inputs of a mini-batch associated with the given working set and classifies the inputs of the mini-batch into the first-class MB(s) and the second-class MB. Each of the first-class MB(s) contains only inputs from the frequently accessed values stored in the GPU memory. The second-class MB contains inputs from the non-frequently accessed values stored in the main memory. (The second-class MB can also contain inputs from the frequently accessed values stored in the GPU memory.) The accelerator schedules the first-class MB(s) for training of the MLM using the GPU(s). During at least part of the training of the MLM with the first-class MB(s), the accelerator obtains the second-class MB. In this way, the GPU(s) can perform training operations for the first-class MB(s) while the accelerator obtains the second-class MB, which can avoid introduction of extra delay from collecting inputs for the second-class MB. In terms of the timing of updates to model parameters, at least some updates to the model parameters from the training with the first-class MB(s) are deferred until after training of the MLM with the second-class MB. By deferring updates, the results of the training can closely track, or even match, the results of training the MLM with the inputs of the mini-batch in a training iteration without using an accelerator pipeline. The accelerator schedules the second-class MB for training of the MLM using the GPU(s). Finally, after the training of the MLM with the second-class MB, the accelerator updates the non-frequently accessed values stored in the main memory for the second-class MB. The GPU(s) also update model parameters such as network parameters and frequently accessed embeddings at this point. In doing so, the GPU(s) apply deferred updates.

According to a second set of techniques and tools described herein, an accelerator performs accelerator operations to train an MLM such as a recommendation model. The accelerator identifies first-class MB(s) and a second-class MB of a given working set. The accelerator schedules the first-class MB(s) for training of the MLM using GPU(s). During at least part of the training of the MLM with the first-class MB(s), the accelerator obtains the second-class MB. In terms of the timing of updates to model parameters, at least some updates to the model parameters from the training with the first-class MB(s) are deferred until after training of the MLM with the second-class MB. The accelerator schedules the second-class MB for training of the MLM using the GPU(s). Finally, after the training of the MLM with the second-class MB, the accelerator updates the non-frequently accessed values stored in the main memory for the second-class MB.

According to a third set of techniques and tools described herein, GPU(s) perform GPU operations to train an MLM such as a recommendation model. Responsive to scheduling of first-class MB(s) of a given working set for training of the MLM, the accelerator performs training operations with the first-class MB(s), successively. The GPU(s) defer at least some updates to the model parameters from the training with the first-class MB(s) until after training of the MLM with a second-class MB of the given working set. Responsive to scheduling of the second-class MB for training of the MLM, the GPU(s) perform training operations with the second-class MB. After the training of the MLM with the second-class MB, the GPU(s) provide updates for the non-frequently accessed values stored in the main memory for the second-class MB. At this point, the GPU(s) also update the network parameters and the frequently accessed values stored in the GPU memory. In doing so, the GPU(s) apply the deferred at least some updates.

The innovations described herein can be implemented as part of a method, as part of a computer system configured to perform the method, or as part of a tangible computer-readable media storing computer-executable instructions for causing one or more processors, when programmed thereby, to perform the method. The various innovations can be used in combination or separately. The innovations described herein include, but are not limited to, the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIG. 2 is a diagram illustrating an example architecture for training an MLM using an accelerator with deferred updates to model parameters.

FIG. 3a is a diagram illustrating an example set of embeddings for a machine learning model ("MLM")

FIG. 5 is a flowchart illustrating a generalized technique for training an MLM using an accelerator pipeline with deferred updates to model parameters, from the perspective of an accelerator.

FIG. 6 is a flowchart illustrating a generalized technique for training an MLM using an accelerator pipeline with deferred updates to model parameters, from the perspective of one or more GPUs.

DETAILED DESCRIPTION

The detailed description presents innovations in training a machine learning model ("MLM"), such as a recommendation model, using an accelerator pipeline with deferred updates to model parameters. With the innovations, in many usage scenarios, resources can be used more efficiently during training operations due to the accelerator pipeline. By deferring updates, the training process can minimize, or even completely eliminate, discrepancies in training results, compared to results of training the MLM without an accelerator pipeline. The innovations include, but are not limited to, the features of the claims.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense.

I. Example Computer Systems.

Figure 1:
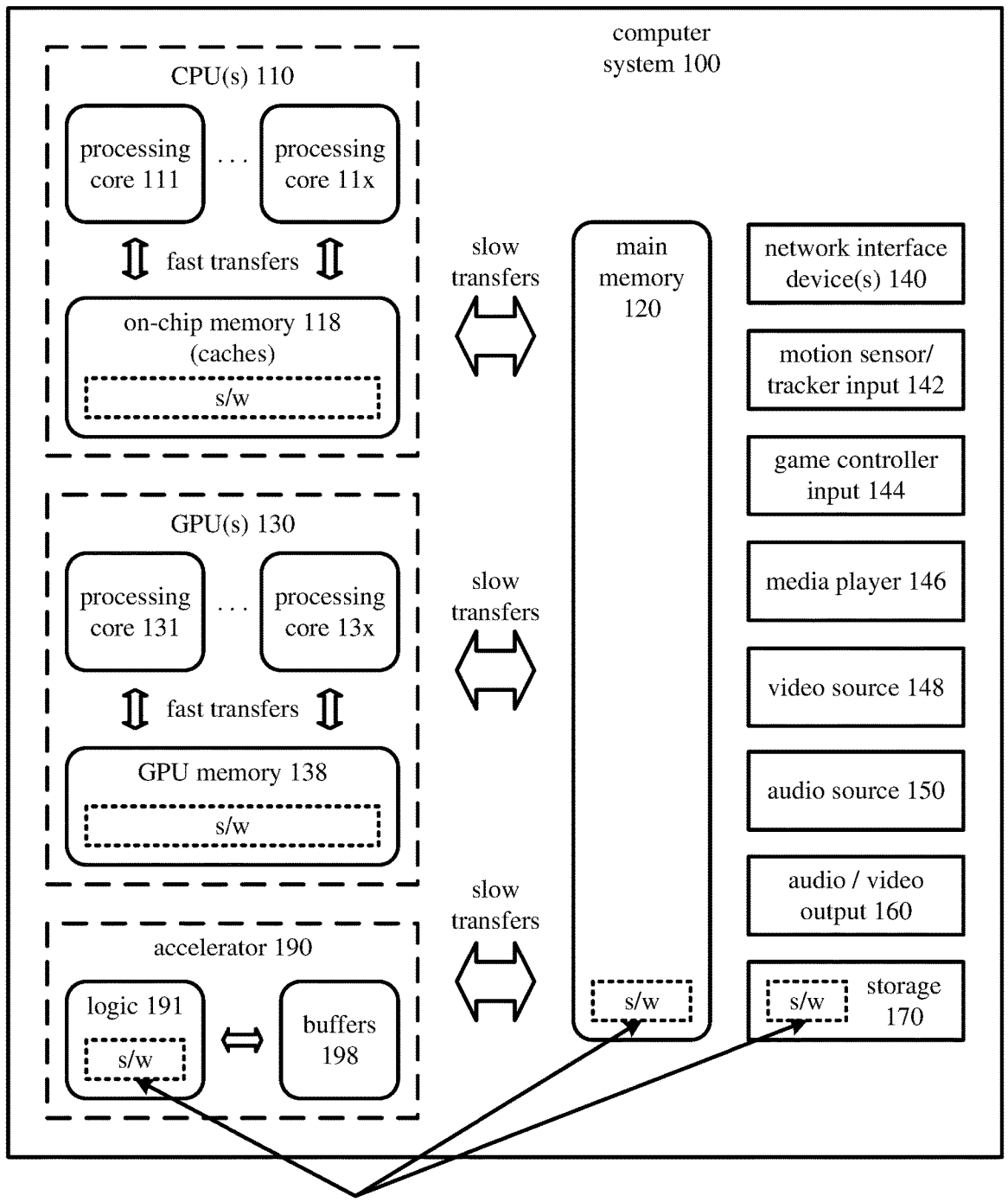
FIG. 1 is a diagram illustrating an example computer system in which some described embodiments can be implemented.

FIG. 1 illustrates a generalized example of a suitable computer system (100) in which several of the described innovations may be implemented. The innovations described herein relate to training a machine learning model ("MLM") using an accelerator pipeline with deferred updates to model parameters. The computer system (100) is not intended to suggest any limitation as to scope of use or functionality, as the innovations may be implemented in diverse computer systems, including special-purpose computer systems.

With reference to FIG. 1, the computer system (100) includes one or more processing cores (110 . . . 11x) and local memory (118) of a central processing unit ("CPU") or multiple CPUs. The processing core(s) (110 . . . 11x) are, for example, processing cores on a single chip, and execute computer-executable instructions. The number of processing core(s) (110 . . . 11x) depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing core(s) (110 . . . 11x). Alternatively, the processing cores (110 . . . 11x) can be part of a system-on-a-chip ("SoC"), application-specific integrated circuit ("ASIC"), or other integrated circuit.

The local memory (118) can store software (180) implementing aspects of the innovations for training an MLM using an accelerator pipeline with deferred updates to model parameters, for operations performed by the respective processing core(s) (110 . . . 11x), in the form of computer-executable instructions. For example, instructions are for operations to read/write non-frequently accessed values of a set of embeddings in main memory (120), for operations to identify inputs of a mini-batch for training by sampling, or for other operations. In FIG. 1, the local memory (118) is on-chip memory such as one or more caches, for which access operations, transfer operations, etc. with the processing core(s) (110 . . . 11x) are fast.

The computer system (100) also includes processing cores (130 . . . 13x) and local memory (138) of a graphics processing unit ("GPU") or multiple GPUs. The number of processing cores (130 . . . 13*x*) of the GPU depends on implementation. The processing cores (130 . . . 13*x*) are, for example, part of single-instruction, multiple data ("SIMD") units of the GPU. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. The GPU memory (138) may be volatile memory (e.g., registers, cache, RAM), non-volatile memory (e.g., ROM, EEPROM, flash memory, etc.), or some combination of the two, accessible by the respective processing cores (130 . . . 13*x*). In some examples described herein, the GPU memory (138) stores frequently accessed values of a set of embeddings.

The GPU memory (138) can store software (180) implementing aspects of the innovations for training an MLM using an accelerator pipeline with deferred updates to model parameters, for operations performed by the respective processing cores (130 . . . 13*x*), in the form of computer-executable instructions such as shader code. For example, the instructions are for operations to read/write the frequently accessed values in the GPU memory (138), for training operations, or for other operations. In FIG. 1, the GPU memory (138) is high-bandwidth memory with pairwise interconnections between GPUs if there are multiple GPUs, for which access operations, transfer operations, etc. with the processing cores (130 . . . 13*x*) are very fast.

The computer system (100) includes main memory (120), which may be volatile memory (e.g., RAM), non-volatile memory (e.g., ROM, EEPROM, flash memory, etc.), or some combination of the two, accessible by the processing core(s) (110 . . . 11*x*, 130 . . . 13*x*). In some examples described herein, the main memory (120) stores non-frequently accessed values of a set of embeddings. The main memory (120) can also store software (180) implementing aspects of the innovations for training an MLM using an accelerator pipeline with deferred updates to model parameters, in the form of computer-executable instructions. In FIG. 1, the main memory (120) is off-chip memory, for which access operations, transfer operations, etc. with the processing cores (110 . . . 11*x*, 130 . . . 13*x*) are slower. The computer system (100) can include a memory access engine (not shown) to facilitate access to the main memory (120).

The computer system (100) also includes an accelerator (190). The accelerator (190) includes logic (191) and buffers (198). The logic (191) implements aspects of the innovations for training an MLM using an accelerator pipeline with deferred updates to model parameters, in the form of computer-executable instructions or otherwise. For example, the logic implements operations to classify and reorder inputs of a mini-batch for a working set into micro-batches ("MBs") of the working set, operations to schedule MBs for execution on the GPU(s) (130), operations to obtain inputs for an MB having non-frequently accessed values, operations to read/write non-frequently accessed values to main memory (120), or other operations. The buffers (198) can, for example, store inputs to be classified as frequently accessed or non-frequently accessed, store values from the set of embeddings (which are retrieved from main memory (120) and/or GPU memory (138)) to be used as inputs for an MB in training of the MLM, or store other values.

More generally, the term "processor" may refer generically to any device that can process computer-executable instructions and may include a microprocessor, microcontroller, programmable logic device, digital signal processor, and/or other computational device. A processor may be a processing core of a CPU, other general-purpose unit, or GPU. A processor may also be a specific-purpose processor implemented using, for example, an ASIC or a field-programmable gate array ("FPGA").

The term "control logic" may refer to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (100) includes one or more network interface devices (140). The network interface device(s) (140) enable communication over a network to another computing entity (e.g., server, other computer system). The network interface device(s) (140) can support wired connections and/or wireless connections, for a wide-area network, local-area network, personal-area network or other network. For example, the network interface device(s) can include one or more Wi-Fi transceivers, an Ethernet port, a cellular transceiver and/or another type of network interface device, along with associated drivers, software, etc. The network interface device(s) (140) convey information such as computer-executable instructions, audio or video input or output, or other data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

The computer system (100) optionally includes other components, such as: a motion sensor/tracker input (142) for a motion sensor/tracker; a game controller input (144), which accepts control signals from one or more game controllers, over a wired connection or wireless connection; a media player (146); a video source (148); and an audio source (150).

The computer system (100) optionally includes a video output (160), which provides video output to a display device. The video output (160) can be an HDMI output or other type of output. An optional audio output (160) provides audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing aspects of the innovations for training an MLM using an accelerator pipeline with deferred updates to model parameters.

The computer system (100) may have additional features. For example, the computer system (100) includes one or more other input devices and/or one or more other output devices. The other input device(s) may be a touch input device such as a keyboard, mouse, pen, or trackball, a scanning device, or another device that provides input to the computer system (100). The other output device(s) may be a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The term "application" or "program" may refer to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including but not limited to non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps/stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

II. Acceleration of Training for Recommendation Models.

A recommendation model can provide suggestions for items that are interesting, promising, or otherwise pertinent to a user. The term item is general. Items can be books, television shows, movies, news stories, products, songs, people, other entities, restaurants, other locations, services, or any other type of item. In many implementations, a recommendation model is trained using machine learning based on ratings for a large group of users for a large selection of items. After training, the recommendation model can be used to identify new items that are pertinent for a given user, or the recommendation model can be used to identify new users for which a given item is pertinent. A recommendation model can also be called a recommendation (or recommender) system, platform, or engine.

Typically, a recommendation model uses continuous features as well as categorical features. The continuous features are processed by neural network layers, which can be multi-layer perceptrons, layers of a deep neural network ("DNN"), or layers of another type of neural network. The continuous features can include, for example, weight values for nodes, bias values for nodes, and values for activation functions in a DNN. The categorical features for a recommendation model are part of a set of embeddings, which can be organized as embedding tables. For example, a set of embeddings includes categorical values for users and items rated by the users. A set of embeddings can be quite large, even if actual ratings only sparsely populate the set of embeddings. Suppose a set of embeddings tracks ratings for 100,000 users and 25,000 items. The number of ratings in a user×item matrix could be as large as 100,000×25,000=2,500,000,000, although in practice a matrix is only sparsely populated with actual rating values, which motivates use of the recommendation model. A set of embeddings can be decomposed into multiple embedding tables, e.g., one or more embedding tables that store vectors of features for users and one or more embedding tables that store vectors of features for items. The embedding tables can be quite large, and their size increases as more users and items interact.

Training a recommendation model can be both computationally intensive (due to neural networks used for training operations) and memory intensive (due to requirements of buffering large embedding tables). In some prior approaches, a recommendation model is trained in a hybrid CPU-GPU mode. In the hybrid CPU-GPU mode, a CPU (with associated main memory) provides high memory capacity for a set of embeddings, and GPUs provide high-throughput, data-parallel execution of training operations for a neural network. In a hybrid CPU-GPU approach, delays due to transfers between the CPU and GPUs can be significant.

An accelerator can reduce such delays. In some approaches, an accelerator exploits the property that only a small number of entries of a set of embeddings are accessed frequently (popular) in typical training scenarios. For details about one such approach, see Adnan et al., "Heterogeneous Acceleration Pipeline for Recommendation System Training," arXiv:2204.05436v1 (Apr. 11, 2022). In this approach, the accelerator uses GPU(s) for all training operations and uses CPU-based main memory to store most embeddings, as in a hybrid CPU-GPU approach. Unlike a hybrid CPU-GPU approach, however, some embeddings are stored in GPU memory. In particular, GPU memory stores frequently accessed embeddings.

More specifically, the accelerator uses an access-frequency-aware memory layout for categorial features of a recommendation model (embeddings). The accelerator exploits the insight that recommendation models typically train on inputs that have an extremely high skew in frequency of access. Frequently accessed entries tend to have a small memory footprint, while being very significant for the training process. In a learning stage, the accelerator identifies frequently accessed embeddings. For example, the accelerator employs mini-batch sampling in its first epoch and uses these inputs to identify frequently accessed embeddings. For most data sets, training a small proportion of mini-batches can identify a large percentage of frequently accessed embeddings.

Subsequently, the frequently accessed embedding entries are stored in GPU memory. Non-frequently accessed embeddings are stored in CPU main memory. From time to time, the accelerator can reevaluate the access pattern of embeddings to ensure that the classification follows current trends in the training data. The accelerator itself only stores the indices of the frequently accessed embeddings, which the accelerator can use to classify inputs of mini-batches into micro-batches ("MBs").

In an accelerate stage, the accelerator pipelines MBs to the GPU(s). Specifically, the accelerator operates on a number of MBs in a working set for a training iteration. The accelerator classifies and reorders inputs of a mini-batch into MBs of different classes for the working set, according to frequency of access.

An MB in a first class ("popular" MB) contains only inputs that are frequently accessed embeddings. The accelerator can directly schedule a popular MB on the GPU(s). The popular MB includes indices for the inputs; the frequently accessed embeddings are already stored in GPU memory.

An MB in a second class ("non-popular" MB) contains inputs that are non-frequently accessed embeddings and can also contain inputs that are frequently accessed embeddings. For a non-popular MB, the accelerator gathers the required working parameters from CPU main memory (and from GPU memory, for any frequently accessed values that are inputs of the non-popular MB) while training operations with popular MB(s) are being executed on GPU(s). Since the accelerator operations to gather embeddings for the non-popular MB are performed concurrently with the GPU operations for training with the popular MB(s), the latency for the accelerator operations to gather embeddings is effectively hidden (that is, extra latency for operations to gather embeddings is avoided).

The accelerator then schedules the non-popular MB for training on the GPU(s), providing the inputs for the non-popular MB to the GPU(s). Thus, the GPU(s) execute training operations for a forward pass, backward pass, and optimization whether an MB is a popular MB or non-popular MB. While the GPU(s) perform training operations for the non-popular MB, the accelerator can begin to identify inputs for the next working set of MBs for a next mini-batch.

In some implementations, a given entry from a set of embeddings can appear as a frequently accessed value in multiple MBs of the same working set. In this case, if the frequently accessed value is updated after training with a given MB, the subsequent training of a different MB (in the same working set) that also includes the frequently accessed value can be affected. This can introduce discrepancies in the results of training with the accelerator, compared to the results of training in a "baseline" approach (without an accelerator pipeline that splits inputs of a mini-batch between MBs of the working set and then pipelines training operations for the respective MBs).

Moreover, the same network parameters can be used in training for different MBs of a working set. If one of the network parameters is updated after training with a given MB, the subsequent training of another MB in the same working set can be affected. Again, this can introduce discrepancies in the results of training with the accelerator, compared to the results of training in a "baseline" approach (without an accelerator pipeline that splits inputs of a mini-batch between MBs of the working set and then pipelines training operations for the respective MBs).

III. Training a Machine Learning Model Using an Accelerator Pipeline with Deferred Updates to Model Parameters.

This section describes innovations in training an MLM, such as a recommendation model, using an accelerator pipeline with deferred updates to model parameters. In many usage scenarios, resources can be used more efficiently during training operations due to the accelerator pipeline. By deferring updates to model parameters, discrepancies in results of the training process can be reduced or even eliminated, compared to the results of training the MLM using a baseline approach (without an accelerator pipeline that splits inputs of a mini-batch between micro-batches ("MBs") of a working set and then pipelines training operations for the respective MBs). For example, by deferring updates to network parameters, the training of later MB(s) in a working set is not affected by changes to the network parameters from the training of earlier MB(s) in the working set. As another example, suppose multiple MBs in a given working set can include the same frequently accessed value. By deferring updates to frequently accessed values, even if multiple MBs in a given working set include the same frequently accessed value, the training of later MB(s) in the working set is not affected by changes to the frequently accessed value from the training of an earlier MB in the working set.

In some examples described herein, the MLM is a recommendation model. Alternatively, the MLM can be a model trained for another usage scenario, such as image recognition, speech recognition, image classification, object detection, facial recognition or other biometric recognition, emotion detection, question-answer responses ("chatbots"), natural language processing, automated language translation, query processing in search engines, automatic content selection, analysis of email and other electronic documents, relationship management, biomedical informatics, identification or screening of candidate biomolecules, generative adversarial networks, or other classification tasks.

The MLM has model parameters, such as network parameters and a set of embeddings. In general, the network parameters are parameters of a neural network or other model used to train the MLM. For example, the network parameters include weight values of nodes of hidden layers of a DNN, bias values of nodes of hidden layers of the DNN, values of activation functions for the DNN, and/or other parameters of the DNN that are adjusted during the training process. In general, the set of embeddings provides inputs to the neural network or other model used to train the MLM, but the values of the set of embedding are also adjusted during the training process. Examples of network parameters and embeddings are described in the next section.

A. Example Architecture.

FIG. 2 shows an example architecture (200) for training an MLM using an accelerator with deferred updates to model parameters. The example architecture (200) includes one or more CPU(s) (210), main memory (220) associated with the CPU(s) (210), a memory access engine (224), one or more GPUs (230a . . . 230x) that include GPU memory (232a . . . 232x), a high-bandwidth switch matrix (238), a bus (240), and an accelerator (290). In general, a computer system with the example architecture (200) can train an MLM using operations in an acceleration pipeline, with deferred updates to model parameters of the MLM.

In the example architecture (200), values for a set of embeddings of the MLM are stored across the main memory (220) and GPU memory (232a . . . 232x). The main memory (220) can store more values for the set of embeddings, but accessing the values stored in the main memory (220) is relatively slow. Accessing values stored in the main memory (220) through the memory access engine (224) is faster than accessing such values through the CPU(s) but is still relatively slow. The CPU(s) (210), GPU(s) (230a ... 230x) and accelerator (290) can transfer information across the bus (240), but transfers across the bus (240) are relatively slow.

In contrast, accessing values stored in the GPU memory (232a ... 232x) is relatively very fast. The GPU(s) (230a ... 230x) can access values stored in their respective GPU memory (232a ... 232x). Moreover, the GPU(s) (230a ... 230x) can access values stored in other GPU memory (232a ... 232x) through the high-bandwidth switch matrix (238), and such access is relatively fast. Compared to the main memory (220), the GPU memory (232a ... 232x) tends to be smaller and more expensive. For that reason, as shown in FIG. 2, the GPU memory (232a ... 232x) stores frequently accessed values of the set of embeddings, while the main memory (220) stores non-frequently accessed values of the set of embeddings. The frequently accessed values of the set of embeddings can be distributed across the GPU memory (232a ... 232x), with memory for different GPUs storing different portions (e.g., tables) of the frequently accessed values. Even so, retrieval of values through the switch matrix (238) for training is very fast.

The memory access engine (224) implements operations to read values from and write values to the main memory (220). The CPU(s) (210) also implement operations to read values from and write values to the main memory (220), as an alternative slower path. The accelerator (290) and GPU(s) (230a ... 230x) can update values in the main memory (220) through the memory access engine (224) or CPU(s) (210). With respect to the training process, the CPU(s) (210) can implement operations to select inputs for a mini-batch from the set of embeddings for a working set. In doing so, the CPU(s) (210) can apply various sampling strategies. Typically, the CPU(s) apply a sampling strategy that has a bias towards selection of certain values that are more relevant for the training process, which has the effect of selecting values stored in the GPU memory more frequently. The CPU(s) (210) can also implement arbitrary other operations. (As explained below, the accelerator (290) classifies the inputs of the mini-batch into micro-batches ("MBs") of the working set.)

The example architecture (200) can include a single GPU, two GPUs, four GPUs, eight GPUs, or some other number of GPUs, depending on implementation. The GPU(s) (230a ... 230x) implement operations to train the MLM. For example, for training of the MLM with a given MB, the GPU(s) (230a ... 230x) implement forward operations in a neural network with the inputs in the given MB, backward propagation operations for the inputs in the given MB, backward propagation operations for the neural network parameters, and operations to determine updates to the model parameters (e.g., optimization operations to determine gradients for the inputs in the given MB and to determine gradients for the neural network parameters). The GPU(s) (230a ... 230x) are configured to perform training operations for different MBs in successive training of the MBs (one MB after another MB).

The GPU(s) (230a ... 230x) also implement operations to update model parameters of the MLM. Thus, the GPU(s) (230a ... 230x) implement operations to update network parameters and implement operations to update values of the set of embeddings stored in the GPU memory (232a ... 232x). In the example architecture (200), some updates to model parameters are deferred within a working set. For example, updates to network parameters are deferred until after training of the MLM with a final MB of the working set. Or, as another example, updates to frequently accessed embeddings are deferred until after training of the MLM with a final MB of the working set, or at least until after those frequently accessed embeddings are no longer to be read for any later MB of the working set. Deferred updates can be buffered in GPU memory (232a ... 232x), avoiding transfers to/from main memory for the deferred updates.

When updates to model parameters are deferred within a working set, the GPU(s) (230a ... 230x) implement operations to aggregate any updates that affect the same model parameter. For example, for a given network parameter, the GPU(s) (230a ... 230x) can aggregate any updates to the given network parameter from the training of the MLM with different MBs of a working set. Or, as another example, for a given frequently accessed value of the set of embeddings, the GPU(s) (230a ... 230x) can aggregate any updates to the given frequently accessed value from the training of the MLM with different MBs of a working set.

The GPU(s) (230a ... 230x) also implement operations to provide updates to non-frequently accessed values of the set of embeddings to the accelerator (290), after training completes for an MB that contains the non-frequently accessed values as inputs. Alternatively, the GPU(s) (230a ... 230x) can directly update the values in main memory (220).

The accelerator (290) implements operations to identify MBs of a working set. In particular, the accelerator (290) implements operations to classify inputs of a mini-batch for the working set into the respective MBs. A mini-batch contains multiple entries from the set of embeddings, but less than all of the entries of the set of embeddings. An MB contains a subset of the entries of the mini-batch. The number of MBs in a working set depends on implementation. For example, the number of MBs in a working set is 2, 4, 8, or some other number of MBs greater than 2.

An MB can be a first-class MB, which contains only frequently accessed values of a set of embeddings as inputs, which are stored in the GPU memory (232a ... 232x). Or, an MB can be a second-class MB, which contains non-frequently accessed values of the set of embeddings as inputs, which are stored in the main memory (220), and which can also contain frequently accessed values of a set of embeddings as inputs, which are stored in the GPU memory (232a ... 232x).

In typical usage scenarios, a working set includes one or more first-class MBs and one second-class MB. Thus, for example, the working set includes one first-class MB, three first-class MBs, seven first-class MBs, or some other number of first-class MBs. The number of first-class MBs in the working set depends on the number of inputs in the working set and also depends on how the inputs selected for the working set are classified.

In some example implementations, to hide latency associated with identifying the MBs of a working set, the accelerator (290) can identify the MBs during the training of the MLM with a final MB of a previous working set.

The accelerator (290) also implements operations to schedule the first-class MB(s) for training of the MLM using the GPU(s) (230a ... 230x). The accelerator (290) provides the first-class MB(s) to the GPU(s) (230a ... 230x). In doing so, the frequently accessed values in the first-class MB(s) are already in the GPU memory (232a ... 232x). The inputs of the first-class MB(s) are represented as indices in the first-class MB(s) scheduled by the accelerator (290), where each of the indices references an entry in the set of embeddings stored in the GPU memory (232a ... 232x).

The accelerator (290) also implements operations to obtain the second-class MB during at least part of the training of the MLM with the first-class MB(s). For example, the accelerator (290) implements read operations to request and receive inputs, for the second-class MB, from the frequently accessed values stored in the GPU memory (232a ... 232x) through the GPUs (230a ... 230x), and the accelerator (290) implements read operations to request and receive inputs from the non-frequently accessed values stored in the main memory (220) through the memory access engine (224) or CPU(s) (210). The read operations for the second-class MB can be performed during at least some of the training operations for the training of the MLM with the first-class MB(s), so as to hide latency associated with the read operations and with operations to combine inputs to obtain the second-class MB. (The accelerator (290) also implements operations to combine the received inputs from the read operations.)

The accelerator (290) also implements operations to schedule the second-class MB for training of the MLM using the GPU(s). The accelerator (290) provides the second-class MB to the GPU(s) (230a ... 230x). In doing so, the accelerator (290) passes actual values for the inputs. Each of the inputs of the second-stage MB is an entry from the set of embeddings retrieved from the GPU memory (232a ... 232x) or the main memory (220).

After the training with the second-class MB finishes, the model parameters of the MLM are updated. As explained above, at least some updates to the model parameters from the training with the first-class MB(s) of the working set are deferred until after training of the MLM with the second-class MB of the working set. This can include updates by the GPU(s) (230a ... 230x) to network parameters and frequently accessed values of the set of embeddings. The accelerator (290) can implement operations to update the non-frequently accessed values stored in the main memory (220) for the second-class MB, after the training of the MLM with the second-class MB. For example, the accelerator (290) implements write operations to write to values stored in the main memory (220) through the memory access engine (224) or CPU(s) (210). Alternatively, the GPU(s) (230a ... 230x) can directly update the values in main memory (220).

B. Example Machine Learning Models.

FIG. 3a shows an example set (300) of embeddings for an MLM. In the example of FIG. 3a, the MLM is a recommendation model. The set of embeddings (300) for the MLM includes values organized along a first dimension for m users and a second dimension for n items. The number of users m depends on the usage scenario and can be hundreds, thousands, or even millions of users. The number of items n also depends on the usage scenario and can be hundreds, thousands, or even millions of items. The items can be books, television shows, movies, news stories, products, songs, people, other entities, restaurants, other locations, services, or any other type of item.

In FIG. 3a, the set of embeddings (300) is organized as multiple embedding tables (301, 302). The first embedding table (301) stores a vector of k weights for each user. As such, the first embedding table (301) is an m×k table. The second embedding table (302) stores a vector of k weights for each item. As such, the second embedding table (302) is an n×k table. In general, the product of the first embedding table (301) and the transpose of the second embedding table (302) indicates a matrix of (estimated) ratings for the respective items for the respective users according to the trained MLM: (m×k)(k×n)=m×n, where each entry of the m×n indicates an estimated rating for a given user and given item.

The number k of weights (also called features) depends on implementation and affects the complexity of the MLM. For a smaller value of k, the MLM is simpler. For a larger value of k, the MLM is more complex. For example, k is 16, 32, 64, 128 or some other number of weights per vector.

In practice, embedding tables can be extremely large, totaling billions or even trillions of bytes. A large embedding table can be split into multiple smaller tables. For example, a large example of the embedding table (301) could be split into multiple embedding tables for users, and a large example of the embedding table (302) could be split into multiple embedding tables for items.

Figure 3B:
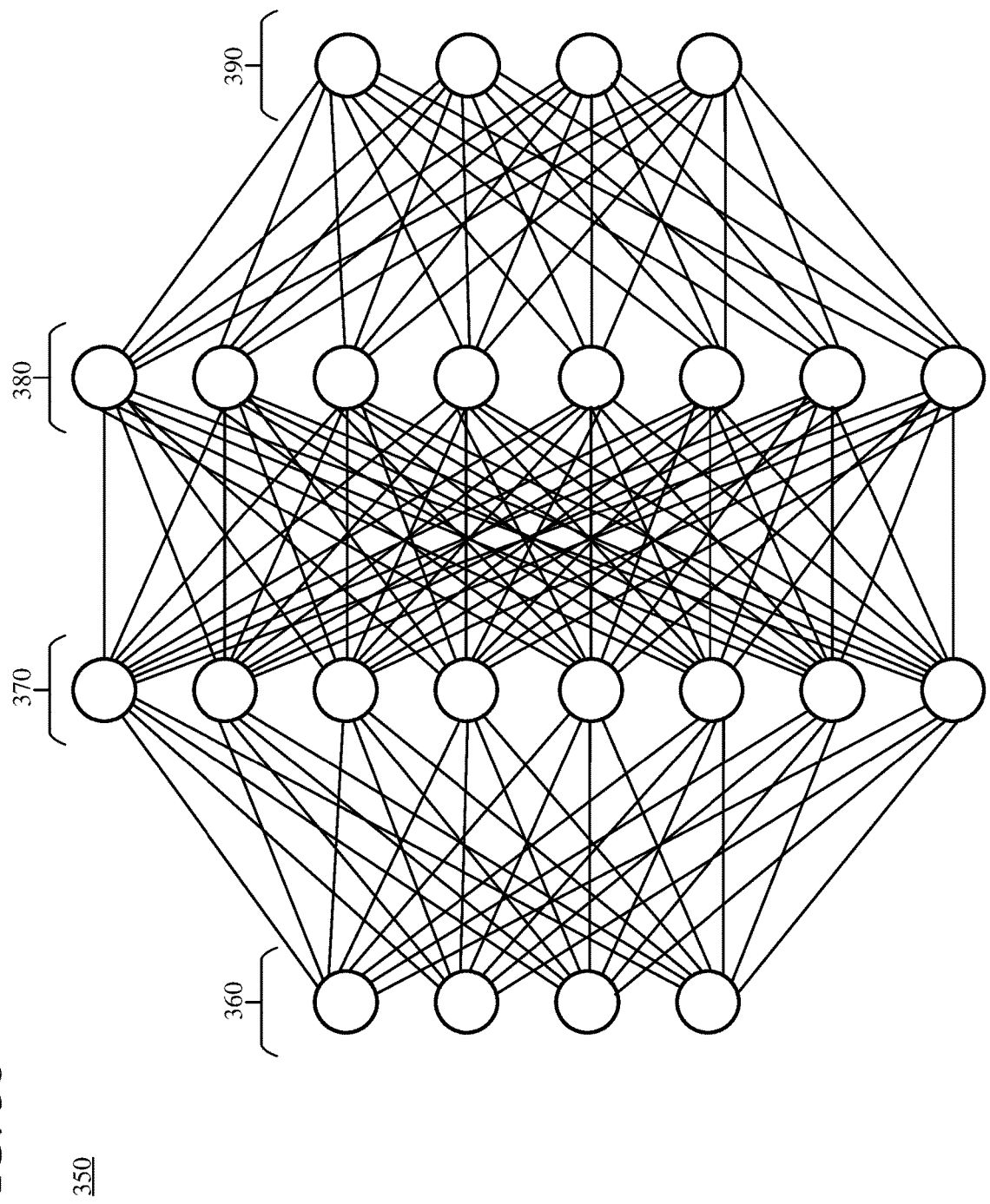
FIG. 3b is a diagram illustrating an example deep neural network for the MLM.

FIG. 3b shows the topology of an example deep neural network ("DNN") (350), which can be used when training the MLM. In general, a DNN operates in at least two different modes. The DNN is trained in a training mode and subsequently used as a classifier in an inference mode. During training, examples in a set of training data (here, the set of embeddings (300)) are applied as inputs to the DNN, and various network parameters of the DNN are adjusted such that, at the completion of training, the DNN can be used as an effective classifier.

Training proceeds in iterations, with each iteration using multiple examples (in a mini-batch) of the set of embeddings (300). For an iteration in conventional approaches that use mini-batch sampling, training typically includes performing forward propagation of the inputs, calculating a loss (e.g., determining differences between the output of the DNN and the expected output given the inputs), and performing backward propagation through the DNN to adjust network parameters (e.g., weights and biases) of the DNN and the values of the set of embeddings used as inputs. In approaches described herein in which a mini-batch is split into multiple MBs of a working set for training, training for a given MB includes forward propagation of the inputs of the given MB, calculating loss, and determining updates to network parameters and the values of the set of embeddings used as inputs, but the updates are deferred until after training with the final MB of the working set. When the parameters of the DNN are appropriate for classifying the training data, the parameters converge and the training process can complete. After training, the DNN can be used in the inference mode, in which one or more examples are applied as inputs to the DNN and forward propagated through the DNN, so that the example(s) can be classified by the DNN.

In the example topology (350) shown in FIG. 3b, a first set (360) of nodes forms an input layer. A second set (370) of nodes forms a first hidden layer. A second hidden layer is formed from a third set (380) of nodes, and an output layer is formed from a fourth set (390) of nodes. More generally, a topology of a DNN can have more hidden layers. (A DNN conventionally has at least two hidden layers.) The input layer, hidden layers, and output layers can have more or fewer nodes than the example topology (350), and different layers can have the same count of nodes or different counts of nodes. Hyper-parameters such as the count of hidden layers and counts of nodes for the respective layers can define the overall topology.

A node of a given layer can provide an input to each of one or more nodes in a later layer, or less than all of the nodes in the later layer. In the example topology (350), each of the nodes of a given layer is fully interconnected to the nodes of each of the neighboring layer(s). For example, each node of the first set (360) of nodes (input layer) is connected to, and provides an input to, each node in the second set (370) of nodes (first hidden layer). Each node in the second set (370) of nodes (first hidden layer) is connected to, and provides an input to, each node of the third set (380) of nodes (second hidden layer). Finally, each node in the third set (380) of nodes (second hidden layer) is connected to, and provides an input to, each node of the fourth set (390) of nodes (output layer). Thus, a layer can include nodes that have common inputs with the other nodes of the layer and/or provide outputs to common destinations of the other nodes of the layer. More generally, a layer can include nodes that have a subset of common inputs with the other nodes of the layer and/or provide outputs to a subset of common destinations of the other nodes of the layer. Thus, a node of a given layer need not be interconnected to each and every node of a neighboring layer.

In general, during forward propagation, a node produces an output by applying a weight to each input from a preceding layer node and collecting the weighted input values to produce an output value. Each individual node can have an activation function and/or a bias applied. For example, for a node n of a hidden layer, a forward function $f()$ can produce an output expressed mathematically as:

$$f(n) = \sigma\left(\sum_{i=0 \text{ to } E-1} w_i x_i + b\right)$$

where the variable E is the count of connections (edges) that provide input to the node, the variable b is a bias value for the node n, the function $\sigma()$ represents an activation function for the node n, and the variables $x_i$ and $w_i$ are an input value and weight value, respectively, for one of the connections from a preceding layer node. For each of the connections (edges) that provide input to the node n, the input value $x_i$ is multiplied by the weight value $w_i$. The products are added together, the bias value b is added to the sum of products, the resulting sum is input to the activation function $\sigma()$. In some implementations, the activation function $\sigma()$ produces a continuous value (represented as a floating-point number) between 0 and 1. For example, the activation function is a sigmoid function. Alternatively, the activation function $\sigma()$ produces a binary 1 or 0 value, depending on whether the summation is above or below a threshold.

A neural network can be trained and retrained by adjusting constituent parameters of the output function $f(n)$. For example, by adjusting the weights $w_i$ and bias values b for the respective nodes, the behavior of the neural network is adjusted. A cost function $C(w, b)$ can be used during back propagation to find suitable weights and biases for the network, where the cost function can be described mathematically as:

$$C(w, b) = \frac{1}{2m}\sum_x \|y(x) - a\|^2$$

where the variables w and b represent weights and biases, the variable m is the number of training inputs, and the variable a is a vector of output values from the neural network for an input vector $y(x)$ of expected outputs (labels) from examples of training data. By adjusting the network weights and biases, the cost function C can be driven to a goal value (e.g., to zero) using various search techniques, such as stochastic gradient descent. The neural network is said to converge when the cost function C is driven to the goal value.

Although the example topology (350) of FIG. 3*b* is for a non-recurrent DNN, the tools described herein can be used for other types of neural networks, including a recurrent neural network or other artificial neural network.

C. Example Operations in Pipelines.

Figure 4A:
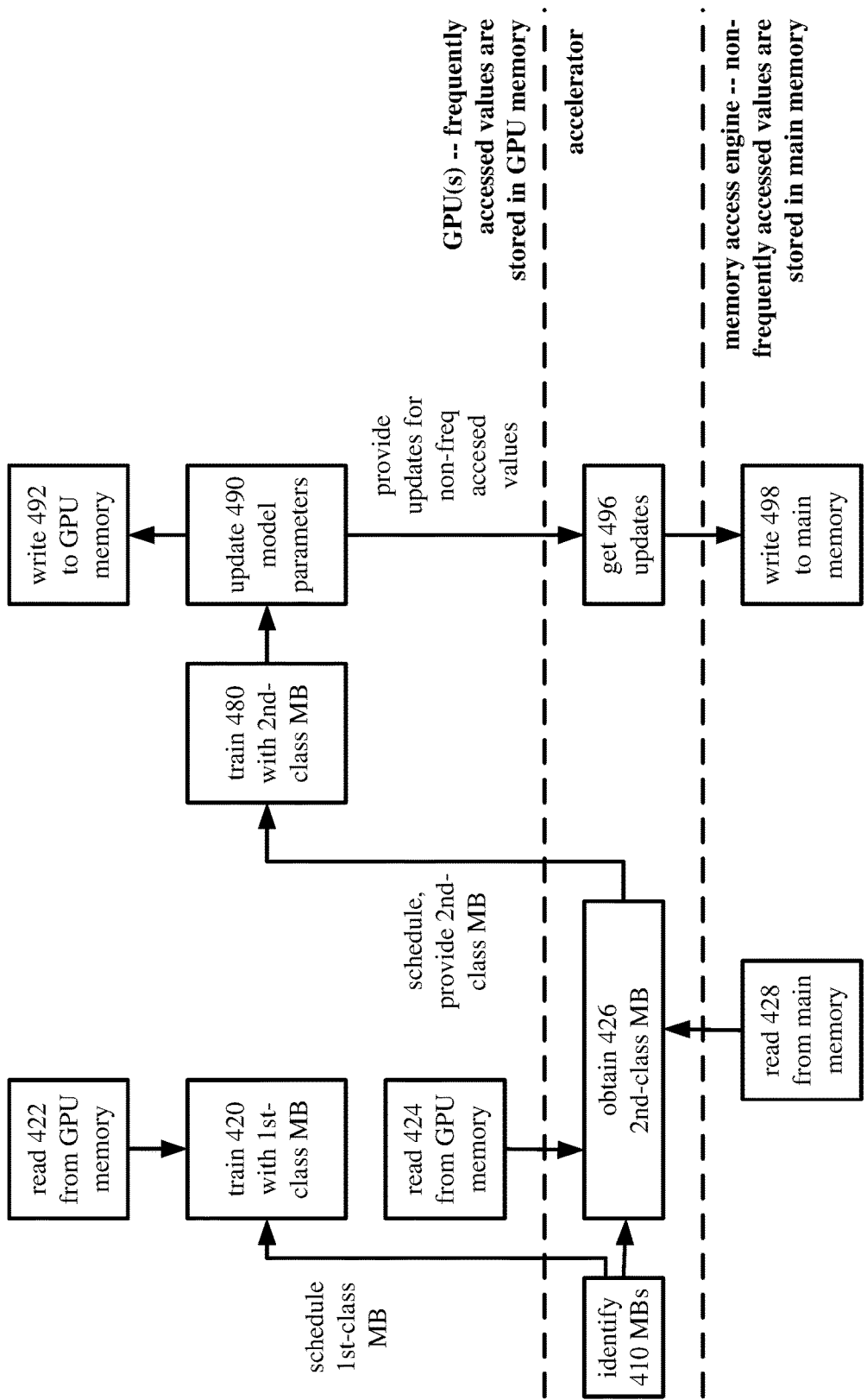
FIGS. 4a and 4b are diagrams illustrating operations in an accelerator pipeline with deferred updates to model parameters when training an MLM.
Figure 4B:
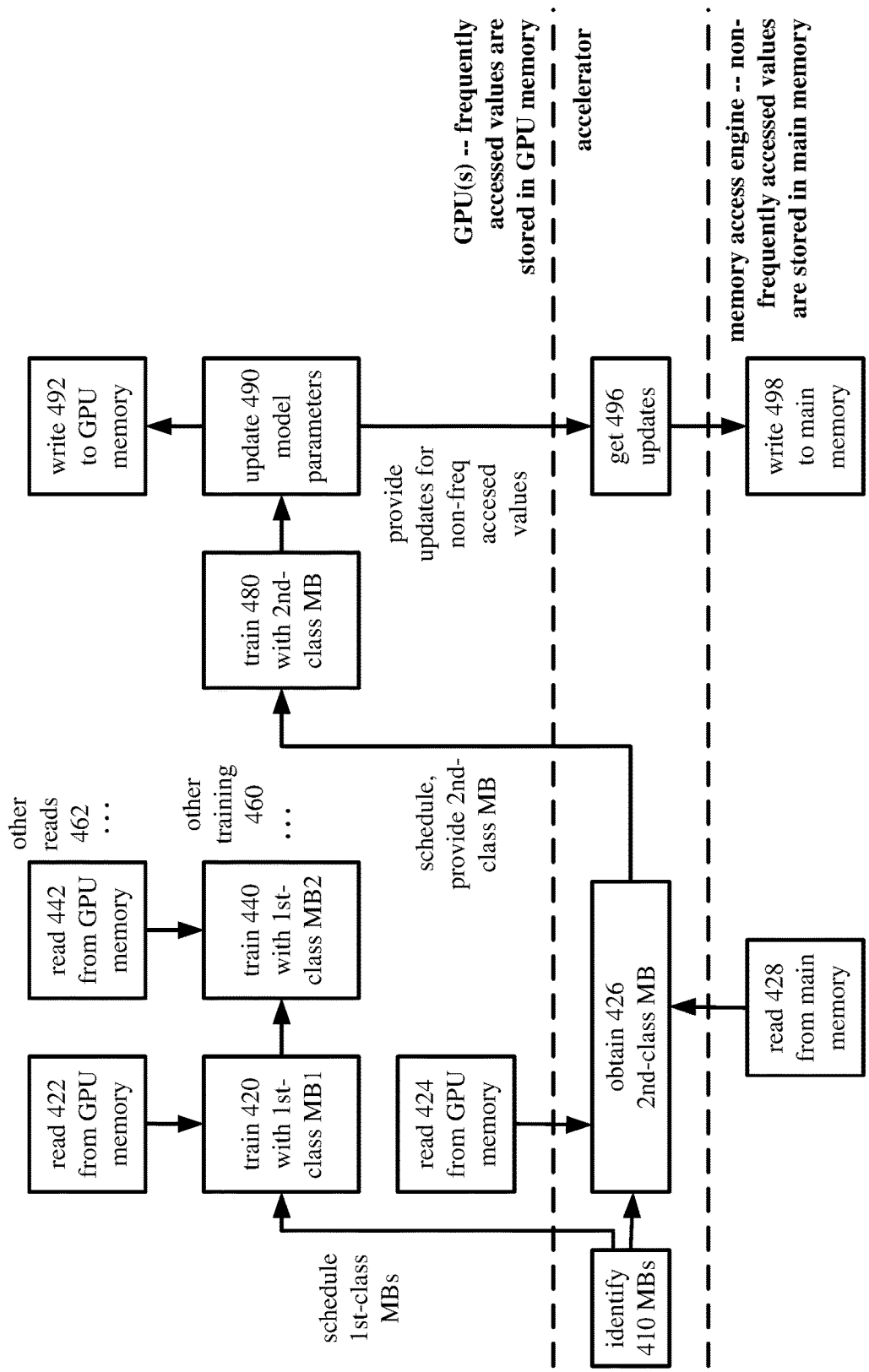

FIGS. 4*a* and 4*b* show the general timing of operations (401, 402) in an accelerator pipeline with deferred updates to model parameters when training an MLM. The operations (401, 402) are split between an accelerator, one or more GPUs, and a memory access engine, as generally indicated by the dashed lines splitting the operations (401, 402).

In the operations (401) shown in FIG. 4*a*, the accelerator identifies (410) MBs of a working set, for example, classifying inputs of a mini-batch into the MBs of the working set. The working set includes a first-class MB and a second-class MB. The accelerator schedules the first-class MB with the GPU(s).

The GPU(s) train (420) the MLM with the first-class MB. For the training, the GPU(s) read (422), from GPU memory, the frequently accessed values that are the inputs for the first-class MB. The GPU(s) defer updates from the training with the first-class MB, however. Instead of applying the updates, the GPU(s) buffer the deferred updates in GPU memory.

Concurrently, the accelerator obtains (426) the second-class MB. To do so, the accelerator reads (424), from GPU memory with read operations to the GPU(s), any frequently accessed values that are inputs for the second-class MB, and the accelerator reads (428), from main memory with read operations to the memory access engine, the non-frequently accessed values that are inputs for the second-class MB. The accelerator combines the retrieved inputs for the second-class MB. Although retrieving and combining the inputs for the second-class MB can be time-consuming, the delay for such operations is at least in part nullified by overlapping with the training (420) by the GPU(s). The accelerator then schedules the second-class MB on the GPU(s), providing the second-class MB to the GPU(s).

The GPU(s) train (480) the MLM with the second-class MB. For the training, the GPU(s) use the values provided with the second-class MB. The deferred updates from the training (420) with the first-class MB are buffered in GPU memory during the training (480) with the second-class MB.

After the training completes, the GPU(s) update (490) model parameters for the MLM. To do so, the GPU(s) write (492) values to GPU memory. For example, the GPU(s) update network parameters, which can be buffered in GPU memory, and the GPU(s) update frequently accessed values stored in GPU memory. In doing so, the GPU(s) apply updates from the training (480) with the second-class MB and also apply the deferred updates from the training (420) with the first-class MB.

The GPU(s) also provide, to the accelerator, updates for the non-frequently accessed values that are inputs in the second-class MB. For example, the GPU(s) write the updates to GPU memory, and the accelerator then reads the updated values from the GPU memory with read operations to the GPU(s). Alternatively, the GPU(s) provides the updates for the non-frequently accessed values in some other way.

The accelerator gets (496) the updates for the non-frequently accessed values and applies the updates to the non-frequently accessed values stored in main memory. To do so, the accelerator writes (498), to main memory with write operations to the memory access engine, the updated non-frequently accessed values for the inputs in the second-class MB.

Many of the operations shown in FIG. 4*b* are the same as corresponding operations shown in FIG. 4*a*. Whereas FIG. 4*a* shows training and update operations for a working set with one first-class MB, however, the working set in FIG. 4*b* has multiple first-class MBs.

In the operations (402) shown in FIG. 4*b*, the accelerator identifies (410) MBs of a different working set, for example, classifying inputs of a mini-batch into the MBs of the different working set. This working set includes multiple first-class MBs and a second-class MB. The accelerator schedules the first-class MBs with the GPU(s).

The GPU(s) train (420) the MLM with the first MB (MB1) of the first-class MBs. For the training, the GPU(s) read (422), from GPU memory, the frequently accessed values that are the inputs for the first MB (MB1). The GPU(s) defer updates from the training with the first MB (MB1), however. Instead of applying the updates, the GPU(s) buffer the deferred updates in GPU memory.

The GPU(s) then train (440) the MLM with the second MB (MB2) of the first-class MBs. For the training, the GPU(s) read (442), from GPU memory, the frequently accessed values that are the inputs for the second MB (MB2). The GPU(s) defer updates from the training with the second MB (MB2), however. Instead of applying the updates, the GPU(s) buffer the deferred updates in GPU memory.

In successive training of other MBs on an MB-after-MB basis, the GPU(s) can similarly perform other training (460) for other MBs of the first-class MBs. For such training, the GPU(s) perform other reading (462) operations from GPU memory to get the frequently accessed values that are the inputs for the other first-class MBs.

Concurrently with at least part of the training (420, 440, 460) by the GPU(s), the accelerator obtains (426) the second-class MB. To do so, the accelerator reads (424), from GPU memory with read operations to the GPU(s), any frequently accessed values that are inputs for the second-class MB, and the accelerator reads (428), from main memory with read operations to the memory access engine, the non-frequently accessed values that are inputs for the second-class MB. The accelerator combines the retrieved inputs for the second-class MB. The delay for such operations is at least in part nullified by overlapping with the training (420, 440, 460) by the GPU(s). The accelerator then schedules the second-class MB on the GPU(s), providing the second-class MB to the GPU(s).

The GPU(s) train (480) the MLM with the second-class MB. For the training, the GPU(s) use the values provided with the second-class MB. The deferred updates from the training (420, 440, 460) with the first-class MBs are buffered in GPU memory during other, later training for the working set. For example, the updates from the training (420) with the first MB (MB1) of the first-class MBs are buffered in GPU memory during the training (440, 460, 480) with later MBs of the working set. Similarly, the updates from the training (440) with the second MB (MB2) of the first-class MBs are buffered in GPU memory during the training (460, 480) with later MBs of the working set.

After the training completes, the GPU(s) update (490) model parameters for the MLM. To do so, the GPU(s) write (492) values to GPU memory. For example, the GPU(s) update network parameters, which can be buffered in GPU memory, and the GPU(s) update frequently accessed values stored in GPU memory. In doing so, the GPU(s) apply updates from the training (480) with the second-class MB and also apply the deferred updates from the training (420, 440, 460) with the first-class MBs.

The GPU(s) also provide, to the accelerator, updates for the non-frequently accessed values that are inputs in the second-class MB. For example, the GPU(s) write the updates to GPU memory, and the accelerator then reads the updated values from the GPU memory with read operations to the GPU(s). Alternatively, the GPU(s) provides the updates for the non-frequently accessed values in some other way.

The accelerator gets (496) the updates for the non-frequently accessed values and applies the updates to the non-frequently accessed values stored in main memory. To do so, the accelerator writes (498), to main memory with write operations to the memory access engine, the updated non-frequently accessed values for the inputs in the second-class MB.

D. Example Accelerator Operations and GPU Operations.

FIG. 5 shows a generalized technique (500) for training an MLM using an accelerator pipeline with deferred updates to model parameters, from the perspective of an accelerator. A computer system that implements an accelerator for training of an MLM using one or more GPUs, as described with reference to FIG. 2 or otherwise, can perform the technique (500). In particular, the accelerator of such a computer system performs the accelerator operations shown in FIG. 5.

Conversely, FIG. 6 shows a generalized technique (600) for training an MLM using an accelerator pipeline with deferred updates to model parameters, from the perspective of one or more GPUs. A computer system that implements an accelerator for training of an MLM using one or more GPUs, as described with reference to FIG. 2 or otherwise, can perform the technique (600). In particular, the GPU(s) of such a computer system perform the GPU operations shown in FIG. 6.

The MLM has model parameters. For example, the model parameters include network parameters and a set of embeddings. The network parameters can be neural network parameters such as weight values for nodes, bias values for nodes, or values of activation functions for a neural network. The set of embeddings includes frequently accessed values, which are stored in GPU memory, and non-frequently accessed values, which are stored in main memory associated with a CPU. For a recommendation model, for example, the set of embeddings includes values organized along a first dimension (for users) and second dimension (for items). The set of embeddings can be organized as multiple embedding tables, e.g., embedding tables with vectors of features for users and embedding tables with vectors of features for items, where values (vectors of features) for some users and items are frequently accessed as inputs for MBs, and values (vectors of features) for other users and items are not frequently accessed as inputs for MBs.

The number of GPUs used for training in the computer system depends on implementation. For example, the computer uses a single GPU, two GPUs, four GPUs, eight GPUs, or some other number of GPUs.

FIGS. 5 and 6 show operations performed for a working set of MBs. Inputs of a mini-batch are split between the MBs of the working set. The working set includes one or more first-class MBs (which contain only frequently accessed values as inputs) and one or more second-class MBs (which contain non-frequently accessed values as inputs but can also contain frequently accessed values as inputs). In general, a mini-batch includes multiple entries from the set of embeddings but less than all of the set of embeddings. An MB (whether a first-class MB or second-class MB) contains a subset of the entries of the mini-batch. For a recommendation model, the working set of MBs typically includes a small fraction of the embeddings in the set of embeddings.

The number of MBs in the working sets depends on implementation. For example, the working set includes a single first-class MB, three first-class MBs, seven first-class MBs, or some other number of first-class MBs. Typically, the working set includes a single second-class MB, but the working set can alternatively include multiple second-class MBs.

The operations shown in FIGS. 5 and 6 can be repeated for one or more subsequent working sets of MBs, for different mini-batches in different training iterations. For example, the accelerator and GPU(s) can repeat the operations for subsequent working sets of MBs up to completion of an epoch for the set of embeddings, at which point each entry of the set of embeddings has been processed in training. The accelerator and GPU(s) can further repeat the operations in working sets of MBs for one or more additional epochs for the set of embeddings, e.g., until the model parameters converge.

With reference to FIG. 5, the accelerator identifies (510) one or more first-class MBs and a second-class MB of a given working set. Each of the first-class MB(s) contains only inputs from frequently accessed values of the set of embeddings. The frequently accessed values are stored in GPU memory. The second-class MB contains inputs from non-frequently accessed values of the set of embeddings. The second-class MB can also contain inputs from the frequently accessed values stored in the GPU memory. The non-frequently accessed values are stored in main memory associated with at least one CPU.

For example, the accelerator identifies (e.g., receives or otherwise determines) a set of inputs of a mini-batch for the working set. The accelerator classifies the respective inputs of the mini-batch as frequently accessed values or non-frequently accessed values. The accelerator reorders the inputs of the mini-batch into MBs such that the first-class MB(s) contain only frequently accessed values as inputs, and the second-class MB contains the remainder of the inputs (including at least some non-frequently accessed values). Typically, the inputs of the mini-batch for the working set are selected from the set of embeddings according to a sampling strategy having a bias towards selection of certain values (the frequently accessed values), which is why such values are stored in the GPU memory.

The accelerator can pipeline the operations to identify the MBs of the working set. For example, the accelerator can identify the first-class MB(s) and second-class MB of the current working set (e.g., identifying a mini-batch of inputs, classifying the inputs of the mini-batch into the MBs of the current working set) during the training of the MLM with a second-class MB of a previous working set.

The accelerator schedules (520) the first-class MB(s) for training of the MLM using the GPU(s). The inputs of the first-class MB(s) are represented as indices in the first-class MB(s) scheduled by the accelerator. That is, the accelerator does not pass actual values to the GPU(s). Instead, each of the indices references an entry in the set of embeddings.

With reference to FIG. 6, responsive to scheduling of one or more first-class MBs of a given working set for training of the MLM, the GPU(s) perform (610) training operations with the first-class MB(s), successively (on an MB-after-MB basis). Each of the first-class MB(s) contains only inputs from frequently accessed values of the set of embeddings, which are stored in GPU memory for the GPU(s). The GPU(s) can use the indices for inputs in the first-class MB(s) to retrieve the actual frequently accessed values from GPU memory.

For example, as part of the training of the MLM with a given MB among the first-class MBs, the GPU(s) perform forward operations in a neural network with the inputs in the given MB, perform backward propagation operations for the inputs (values of embeddings) in the given MB, perform backward propagation operations for the neural network parameters, and determine (but do not yet apply) updates to the model parameters, including updates to the inputs in the given MB and updates to the neural network parameters. When the first-class MB(s) include multiple first-class MBs, the GPU(s) perform training operations for the multiple first-class MBs, respectively, in successive training of the multiple first-class MBs on an MB-after-MB basis.

The GPU(s) defer at least some updates to the model parameters from the training with the first-class MB(s) until after training of the MLM with a second-class MB of the given working set. For example, the GPU(s) defer updates to network parameters from the training of the first-class MB(s). In this way, the training of later ones of the first-class MB(s) and the second-class MB is not affected by changes to the network parameters from the training of earlier ones of the first-class MB(s) in the same working set, which could introduce discrepancies (compared to a baseline training approach without an accelerator pipeline that splits inputs of a mini-batch between MBs of the working set).

As another example, the GPU(s) can defer updates to frequently accessed values stored in GPU memory from the training of the first-class MB(s). In some example implementations, a given entry from the set of embeddings can appear as a frequently accessed value in multiple MBs of the same working set. By deferring updates to the frequently accessed values, the training of later ones of the first-class MB(s) and the second-class MB is not affected by changes to the frequently accessed values from the training of earlier ones of the first-class MB(s) in the same working set, which could introduce discrepancies (compared to a baseline training approach without an accelerator pipeline that splits inputs of a mini-batch between MBs of the working set). On the other hand, if the inputs in MBs of a given working set are guaranteed to be disjoint (that is, no entry from the set of embeddings can appear in different MBs of the given working set), the GPU(s) can immediately apply the updates to frequently accessed values stored in GPU memory without affecting later training with MBs of the given working set.

Or, as another example, the GPU(s) can defer both updates to the network parameters and updates to frequently accessed values stored in the GPU memory.

During at least part of the training of the MLM with the first-class MB(s), the accelerator obtains (530) the second-class MB. In terms of timing, at least some updates to the model parameters from the training with the first-class MBs are deferred until after training of the MLM with the second-class MB, as described above.

For example, the accelerator requests from the GPU(s) any inputs for the second-class MB from frequently accessed values stored in the GPU memory, and receives such inputs from the GPU(s). The accelerator also requests, from a CPU or main memory engine, any inputs for the second-class MB from the non-frequently accessed values stored in the main memory, and receives such inputs. The accelerator performs the operations to request/receive the inputs for the second-class MB during at least some operations for the training of the MLM with the first-class MB(s), which effectively avoids extra latency that would otherwise be associated with the operations to request/receive the inputs for the second-class MB. The accelerator combines the received inputs (if any) from the frequently accessed values stored in the GPU memory and the received inputs from the non-frequently accessed values stored in the main memory.

The accelerator schedules (540) the second-class MB for training of the MLM using the GPU(s). The inputs of the second-class MB are represented as actual values in the second-class MB scheduled by the accelerator. That is, each of the inputs of the second-stage MB is an entry from the set of embeddings retrieved from the GPU memory or the main memory.

Responsive to scheduling of the second-class MB for training of the MLM, the GPU(s) perform (630) training operations with the second-class MB. For example, as part of the training of the MLM with the second-class MB as the given MB, the GPU(s) perform forward operations in a neural network with the inputs in the given MB, perform backward propagation operations for the inputs (values of embeddings) in the given MB, perform backward propagation operations for the neural network parameters, and determine updates to the model parameters, including updates to the inputs in the given MB and updates to the neural network parameters.

After the training of the MLM with the second-class MB, the GPU(s) provide (640) updates for the non-frequently accessed values stored in the main memory for the second-class MB, and also update (650) the network parameters and the frequently accessed values stored in the GPU memory. In doing so, the GPU(s) apply the deferred at least some updates.

For example, the GPU(s) update network parameters (such as neural network parameters) among the model parameters. When updates to the network parameters from training with the first-class MBs have been deferred, the GPU(s) apply the deferred updates to the network parameters. To the extent a given one of the network parameters is affected by multiple updates, the GPU(s) can aggregate any updates from the training of the MLM with the first-class MB(s) and the training of the MLM with the second-class MB for the given network parameter.

As another example, the GPU(s) update frequently accessed values stored in GPU memory (for the inputs to the MBs) among the model parameters. When updates to the frequently accessed values stored in GPU memory from training with the first-class MB(s) have been deferred, the GPU(s) apply the deferred updates to the frequently accessed values stored in GPU memory. To the extent a given one of the frequently accessed values is affected by multiple updates, the GPU(s) can aggregate any updates from the training of the MLM with the first-class MB(s) and the training of the MLM with the second-class MB for the given frequently accessed value.

After the training of the MLM with the second-class MB, the accelerator updates (550) the non-frequently accessed values stored in the main memory for the second-class MB.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A computer system comprising:
    at least one graphics processing unit ("GPU") configured to train a machine learning model ("MLM") having model parameters, the model parameters including network parameters and a set of embeddings;
    GPU memory configured to store frequently accessed values of the set of embeddings;
    main memory, associated with at least one central processing unit ("CPU"), configured to store non-frequently accessed values of the set of embeddings; and
    an accelerator configured to perform accelerator operations comprising:
        identifying one or more first-class micro-batches ("MBs") and a second-class MB of a given working set, wherein each of the one or more first-class MBs contains only inputs from the frequently accessed values stored in the GPU memory, and wherein the second-class MB contains inputs from the non-frequently accessed values stored in the main memory as well as inputs from the frequently accessed values stored in the GPU memory;
        scheduling the one or more first-class MBs for training of the MLM using the at least one GPU;
        during at least part of the training of the MLM with the one or more first-class MBs, obtaining the second-class MB, at least some updates to the model parameters from the training with the one or more first-class MBs being deferred until after training of the MLM with the second-class MB, wherein the obtaining the second-class MB includes:
            requesting and receiving the inputs, for the second-class MB, from the frequently accessed values stored in the GPU memory;
            requesting and receiving the inputs, for the second-class MB, from the non-frequently accessed values stored in the main memory; and
            combining the received inputs from the frequently accessed values stored in the GPU memory and the received inputs from the non-frequently accessed values stored in the main memory;
        scheduling the second-class MB for training of the MLM using the at least one GPU, the network parameters and the frequently accessed values stored in the GPU memory being updated using the at least one GPU, including, after the training with the second-class MB, applying the deferred at least some updates to the model parameters from the training with the one or more first-class MBs; and
        after the training of the MLM with the second-class MB, updating the non-frequently accessed values stored in the main memory for the second-class MB.

2. The computer system of claim 1, wherein the at least one GPU is configured to update the network parameters.

3. The computer system of claim 1, wherein, for a given one of the network parameters, the at least one GPU is configured to aggregate any updates from the training of the MLM with the one or more first-class MBs and the training of the MLM with the second-class MB.

4. The computer system of claim 1, wherein the at least one GPU is configured to update the frequently accessed values stored in the GPU memory.

5. The computer system of claim 4, wherein, for a given one of the frequently accessed values stored in the GPU memory, the at least one GPU is configured to aggregate any updates from the training of the MLM with the one or more first-class MBs and the training of the MLM with the second-class MB.

6. The computer system of claim 1, wherein the identifying the one or more first-class MBs and the second-class MB of the given working set includes, during the training of the MLM with a second-class MB of a previous working set:
  identifying a mini-batch of inputs for the given working set; and
  classifying the inputs of the mini-batch into the one or more first-class MBs and the second-class MB.

7. The computer system of claim 1, wherein the network parameters are neural network parameters including weight values for nodes, bias values for nodes, and/or values for activation functions, and wherein the training of the MLM includes, in training for a given MB among the one or more first-class MBs and the second-class MB:
  performing forward operations in a neural network with the inputs in the given MB;
  performing backward propagation operations for the inputs in the given MB;
  performing backward propagation operations for the neural network parameters; and
  determining the updates to the model parameters, the updates to the model parameters including updates for the inputs in the given MB and updates for the neural network parameters.

8. The computer system of claim 1, wherein the one or more first-class MBs include multiple first-class MBs, and wherein the at least one GPU is configured to perform training operations for the multiple first-class MBs, respectively, in successive training.

9. The computer system of claim 1, wherein the one or more first-class MBs consist of a single first-class MB, three first-class MBs, or seven first-class MBs, and wherein each of the one or more first-class MBs and the second-class MB includes multiple entries from a mini-batch, the mini-batch containing multiple entries from the set of embeddings but less than all of the set of embeddings.

10. The computer system of claim 1, wherein the MLM is a recommendation model, wherein the set of embeddings includes values organized along a first dimension and second dimension, wherein the first dimension is users, wherein the second dimension is items, and wherein the set of embeddings is organized as multiple embedding tables.

11. The computer system of claim 1, wherein the identifying the one or more first-class MBs and the second-class MB of the given working set includes:
  identifying a mini-batch of inputs for the given working set, the inputs of the mini-batch being selected from the set of embeddings according to a sampling strategy having a bias towards selection of the frequently accessed values stored in the GPU memory; and
  classifying the inputs of the mini-batch into the one or more first-class MBs and the second-class MB.

12. The computer system of claim 1, wherein the inputs of the one or more first-class MBs are represented as indices in the one or more first-class MBs scheduled by the accelerator, each of the indices referencing an entry in the set of embeddings, and wherein each of the inputs of the second-stage MB is an entry from the set of embeddings retrieved from the GPU memory or the main memory.

13. The computer system of claim 1, wherein the at least one GPU consist of a single GPU, two GPUs, four GPUs, or eight GPUs.

14. The computer system of claim 1, wherein the accelerator is further configured to repeat the accelerator operations for one or more subsequent working sets, up to completion of an epoch for the set of embeddings.

15. The computer system of claim 14, wherein the accelerator is further configured to repeat the accelerator operations in working sets for one or more additional epochs for the set of embeddings.

16. In a computer system that implements an accelerator for training of a machine learning model ("MLM"), a method of performing accelerator operations comprising:
  identifying one or more first-class micro-batches ("MBs") and a second-class MB of a given working set, wherein the MLM has model parameters including network parameters and a set of embeddings, wherein each of the one or more first-class MBs contains only inputs from frequently accessed values of the set of embeddings, the frequently accessed values being stored in graphics processing unit ("GPU") memory, and wherein the second-class MB contains inputs from the frequently accessed values stored in the GPU memory as well as inputs from non-frequently accessed values of the set of embeddings, the non-frequently accessed values being stored in main memory associated with at least one central processing unit ("CPU");
  scheduling the one or more first-class MBs for training of the MLM using the at least one GPU;
  during at least part of the training of the MLM with the one or more first-class MBs, obtaining the second-class MB, at least some updates to the model parameters from the training with the one or more first-class MBs being deferred until after training of the MLM with the second-class MB, wherein the obtaining the second-class MB includes:
    requesting and receiving the inputs, for the second-class MB, from the frequently accessed values stored in the GPU memory;
    requesting and receiving the inputs, for the second-class MB, from the non-frequently accessed values stored in the main memory; and
    combining the received inputs from the frequently accessed values stored in the GPU memory and the received inputs from the non-frequently accessed values stored in the main memory;
  scheduling the second-class MB for training of the MLM using the at least one GPU, the network parameters and the frequently accessed values stored in the GPU memory being updated using the at least one GPU, including, after the training with the second-class MB, applying the deferred at least some updates to the model parameters from the training with the one or more first-class MBs; and
  after the training of the MLM with the second-class MB, updating the non-frequently accessed values stored in the main memory for the second-class MB.

17. One or more non-transitory computer-readable media having stored thereon computer-executable instructions for causing at least one graphics processing unit ("GPU"), when programmed thereby, to perform GPU operations comprising:
  responsive to scheduling of one or more first-class micro-batches ("MBs") of a given working set for training of a machine learning model ("MLM"), performing training operations with the one or more first-class MBs, successively, wherein the MLM has model parameters including network parameters and a set of embeddings, each of the one or more first-class MBs containing only inputs from frequently accessed values of the set of embeddings, the frequently accessed values being stored in GPU memory;

deferring at least some updates to the model parameters from the training with the one or more first-class MBs until after training of the MLM with a second-class MB of the given working set;

responsive to scheduling of the second-class MB for training of the MLM, performing training operations with the second-class MB, the second-class MB containing inputs from non-frequently accessed values of the set of embeddings, the non-frequently accessed values being stored in main memory associated with at least one central processing unit ("CPU"), the second-class MB also containing inputs from the frequently accessed values stored in the GPU memory, the second-class MB having been obtained, during the training operations with the one or more first-class MBs, by accelerator operations comprising:

requesting and receiving the inputs, for the second-class MB, from the frequently accessed values stored in the GPU memory;

requesting and receiving the inputs, for the second-class MB, from the non-frequently accessed values stored in the main memory; and combining the received inputs from the frequently accessed values stored in the GPU memory and the received inputs from the non-frequently accessed values stored in the main memory; and after the training of the MLM with the second-class MB:

providing updates for the non-frequently accessed values stored in the main memory for the second-class MB; and updating the network parameters and the frequently accessed values stored in the GPU memory, including applying the deferred at least some updates.

18. The one or more computer-readable media of claim 17, wherein the at least one GPU is configured to:

update the network parameters, wherein, for the deferred at least some updates, updates to the network parameters are deferred until after the training of the MLM with the second-class MB; and/or update the frequently accessed values stored in the GPU memory, wherein, for the deferred at least some updates, updates to the frequently accessed values for the one or more first-class MBs are deferred until after the training of the MLM with the second-class MB.

19. The one or more computer-readable media of claim 17, wherein, for a given one of the network parameters, the at least one GPU is configured to aggregate any updates from the training of the MLM with the one or more first-class MBs and the training of the MLM with the second-class MB.

20. The one or more computer-readable media of claim 17, wherein, for a given one of the frequently accessed values stored in the GPU memory, the at least one GPU is configured to aggregate any updates from the training of the MLM with the one or more first-class MBs and the training of the MLM with the second-class MB.

* * * * *